Figure 1:
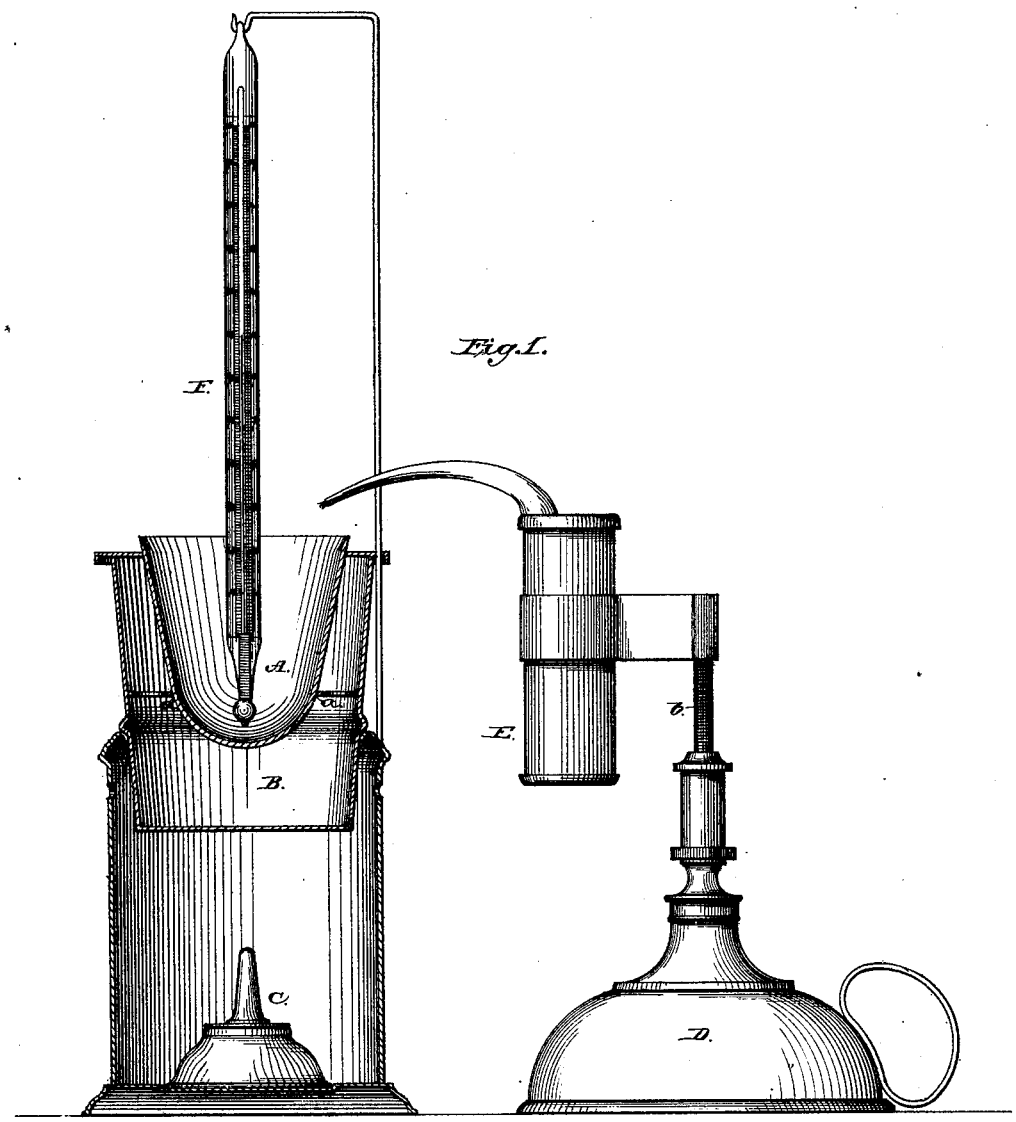

2 Sheets—Sheet 2.

F. B. SQUIRE.
Apparatus for Testing the Igniting Temperature of Hydro-Carbon Fluids.

No. 197,197. Patented Nov. 13, 1877.

UNITED STATES PATENT OFFICE.

FEARGUS B. SQUIRE, OF CLEVELAND, OHIO.

IMPROVEMENT IN APPARATUS FOR TESTING THE IGNITING TEMPERATURE OF HYDROCARBON FLUIDS.

Specification forming part of Letters Patent No. 197,197, dated November 13, 1877; application filed August 4, 1877.

*To all whom it may concern:*

Be it known that I, FEARGUS B. SQUIRE, of the city of Cleveland and State of Ohio, have invented certain Improvements in Apparatus for Testing the Igniting Temperature of Hydrocarbon Fluids, of which the following is a specification; and I do hereby declare that in the same is contained a full, clear, and exact description of my said invention, reference being had to the accompanying drawing, and to the letters of reference marked thereon.

My invention has reference to certain improvements in an apparatus for testing the igniting temperature of hydrocarbon fluids, whereby the results are uniformly obtained with mechanical accuracy and precision.

The hydrocarbon-fluid-testing apparatus ordinarily used consists of a fluid-holding reservoir suspended, by means of a flange at the upper edge thereof, within a water-bath heated through the medium of a lamp, and a thermometer suspended from a bar, with the bulb thereof immersed in the said fluid.

The manner of testing the fluid, or of ascertaining the igniting temperature of the same, by means of the above-described apparatus consists in heating the fluid until the vapor arising from the same will ignite in passing a lighted taper or splint over the surface thereof, the height of the mercury being noted at the time of ignition.

The accuracy of this test, however, depending, as it does, mainly upon the skill of the operator in maintaining the igniting-flame at a common and a specified distance above the surface of the fluid, cannot be relied upon in all cases. The principal causes which operate to destroy the accuracy of tests by means of existing apparatus are the nervous movement of the hand of the operator and the accidental presence of a film of fluid on the flange of the reservoir, conveyed thereto in supplying the same, and which film is closer to the igniting-flame than the surface of the main body of the fluid.

These inaccuracies are, however, obviated in the present invention; which consists, first, in the employment of a gas-flame, or the flame from a wick saturated with alcohol, hydrocarbon fluid, oil, or other inflammable liquid, or from any suitable combustible substance adapted to have a movement toward or over the surface of the fluid to be tested, limited to an arbitrarily-selected distance from the surface of the same, which distance is not affected by the unsteadiness of the hand of the operator.

The said invention consists, secondly, in providing the fluid-reservoir with a sharpened edge instead of a flange, as is ordinarily used, in order to prevent any portion of the fluid being brought closer to the igniting-flame than the main body thereof, as will hereinafter fully appear.

In the further description of the present invention which follows, reference is made to the accompanying drawing, forming a part hereof, and in which—

Figure 2:
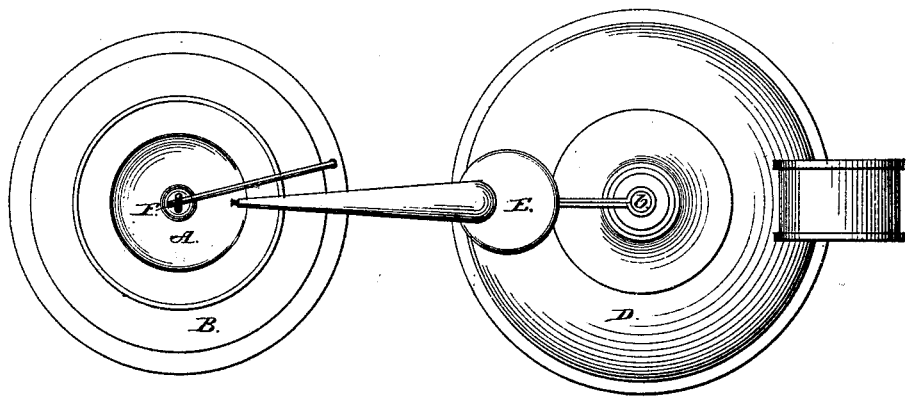

Figure 1 is a side elevation of my improved apparatus, partly in section. Fig. 2 is a plan of the same.

Similar letters of reference indicate similar parts in both views.

A is the fluid-holding reservoir, supported within a water-bath, B, located over a lamp, C, by means of projections *a* in the interior of the water-bath. It will be seen that the upper edge of the reservoir A is sharpened, so as to leave, practically, no surface capable of supporting a film of fluid elevated above the main body thereof. D is a stand, within which the central screw-stem *b* is adapted to turn freely. The central stem, which is variable in length, supports a spirit-lamp, E, the wick of which passes through a bent tube adapted to bring the flame, which is as small as practicable, about centrally of the reservoir A. Instead of the lamp, however, a taper or other flame-producing device may be used, supported upon the stem, and adapted to have a swinging movement, as is the case with the lamp; or a lamp or taper may be used having a vertical motion instead of the swinging movement described, if desired, the object being to effect to an absolute certainty a prearranged approach of the flame toward the surface of the fluid.

The thermometer (represented by F) is suspended in the usual manner, with the bulb thereof extending to a certain depth within the reservoir, and it is graduated to indicate the depth of immersion in the fluid, and for the purpose of regulating the height of the igniting-flame above the surface of the same.

The operation of ascertaining the temperature of the fluid at which the same will ignite is as follows: The fluid to be tested is placed in the reservoir to a depth prearranged and indicated by the marks on the thermometer, and the lamp underneath the water-bath lighted. As the fluid is gradually heated, the flame from the spirit-lamp, which is set at a prearranged distance above the surface of the fluid, is moved slowly over the same, the height of the mercury being constantly watched during the process. Upon the ignition of the vapor arising from the fluid, the temperature of the same, as indicated by the mercury, is recorded, and represents what is known to the trade as the "fire-test" of the fluid.

The special advantages of the present invention, as hereinbefore indicated, may be summed up as follows: The employment of an igniting-flame having, practically, no power to communicate heat to the body of the fluid contained in the reservoir; the steadiness of the flame, no portion thereof, in consequence of unequal combustion, shooting toward the surface of the fluid, as is the case where a lighted wooden splint or taper is used; the accuracy of vertical adjustment of the flame with reference to the surface of the fluid, independent of the skill of the operator; and the uniformity of the horizontal movement of the igniting-flame across the surface of the fluid, attainable by the action of the hand of the operator upon the stem supporting the spirit-lamp.

Having thus described my invention, what I claim as new, and wish to secure by Letters Patent of the United States, is—

1. In an apparatus for ascertaining the igniting temperature of hydrocarbon fluid, the combination of a water-bath with a fluid-holding reservoir, having a sharpened upper edge, or a reservoir having, practically, no surface for holding a film of fluid above the level of the main body thereof, substantially as herein shown and described.

2. In an apparatus for ascertaining the igniting temperature of hydrocarbon fluid, the combination of a fluid-holding reservoir and a vertically and circumferentially adjustable flame-holding or flame-supporting device, adapted to admit of the movement of the flame over or across the surface of the fluid at a regular specified vertical distance therefrom, substantially as and for the purpose herein specified.

3. In an apparatus for ascertaining the igniting temperature of hydrocarbon fluid, the combination of a fluid-holding reservoir, a vertically-adjustable flame-holding device, and a thermometer graduated from the upper part of the bulb into equal spaces, independently of the thermometrical scale, to indicate the depth of its immersion in the said fluid, and for the purpose of adjusting the igniting-flame to a required distance above the surface of the same, substantially as herein described.

In testimony whereof I have hereunto subscribed my name this 10th day of July, in the year of our Lord 1877.

FEARGUS B. SQUIRE.

Witnesses:
WM. T. HOWARD,
THOS. MURDOCH.